United States Patent [19]
Akimoto

[11] Patent Number: 5,394,844
[45] Date of Patent: Mar. 7, 1995

[54] FUEL PRESSURE CONTROL METHOD AND SYSTEM FOR DIRECT FUEL INJECTION ENGINE

[75] Inventor: Akira Akimoto, Musashino, Japan

[73] Assignee: Fuji Jukogyo Kabushiki Kaisha, Tokyo, Japan

[21] Appl. No.: 162,332

[22] Filed: Dec. 7, 1993

[30] Foreign Application Priority Data

Jan. 8, 1993 [JP] Japan .................... 5-002116

[51] Int. Cl.6 ............................................ F02M 37/20
[52] U.S. Cl. ........................ 123/179.3; 123/179.17; 123/516
[58] Field of Search ............... 123/179.3, 179.17, 456, 123/514, 516

[56] References Cited

U.S. PATENT DOCUMENTS

| | | | |
|---|---|---|---|
| 4,329,951 | 5/1982 | Seilly | 123/179.17 |
| 4,370,967 | 2/1983 | Gmelin et al. | 123/516 |
| 4,622,930 | 11/1986 | Hamano et al. | 123/179.3 |
| 4,807,583 | 2/1989 | Thornthwaite et al. | 123/516 |
| 4,875,443 | 10/1989 | Sano et al. | 123/179.3 |
| 4,878,474 | 11/1989 | Hack, Jr. | 123/516 |
| 4,905,641 | 3/1990 | Miller | 123/516 |
| 4,984,554 | 1/1991 | Ariga et al. | 123/179.17 |

*Primary Examiner*—Raymond A. Nelli
*Assistant Examiner*—Thomas N. Moulis
*Attorney, Agent, or Firm*—Beveridge, DeGrandi, Weilacher & Young

[57] ABSTRACT

Based on the output signal of the fuel sensor, it is judged whether or not the fuel (liquid fuel) is detected in the high pressure fuel system. When the fuel is detected, the count value for counting the detecting time is compared with the predetermined value. If the count value is equal to or larger than the predetermined value, the electromagnetic type high pressure fuel regulator is rendered closed and the starter motor prohibition flag is cleared to admit energizing the starter motor. As a result of this, the engine is permitted to be started and thus the high pressure fuel pump starts to produce the high pressure in the high pressure fuel system, whereby a sticking or a scuffing in the fuel pump due to poor lubrication can be prevented and an overshoot of the fuel pressure or a void injection in the fuel injector can be avoided.

17 Claims, 9 Drawing Sheets

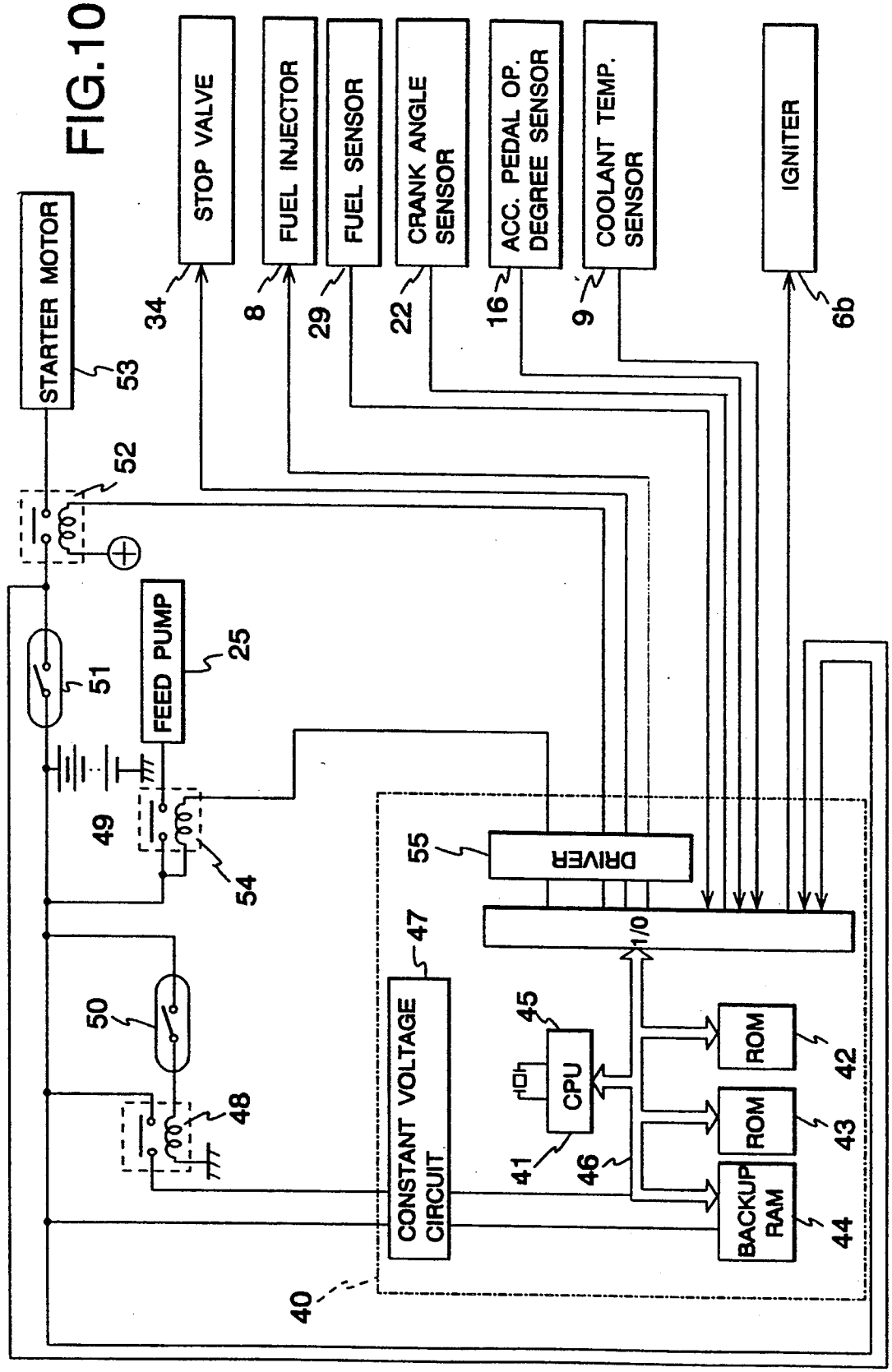

FUEL PRESSURE CONTROL METHOD AND SYSTEM FOR DIRECT FUEL INJECTION ENGINE

BACKGROUND OF THE INVENTION

The present invention relates to a method and a system for controlling a fuel pressure and more particularly to a method and a system for controlling a starter motor at an engine start of a direct fuel injection engine.

Commonly, in a conventional high pressure type direct fuel injection engine, when an engine is stopped, the fuel pressure is relieved by opening a high pressure fuel regulator in a high pressure fuel system, so as to diminish the load of the components of the fuel system for securing durability and reliability thereof.

However, when the fuel pressure is relieved at an engine stop, a vapor tends to be generated in the fuel system due to a sudden decrease in pressure of the fuel heated by a radiation from the engine, so that a defective engine starting may be caused because of a void injection at the fuel injector.

To solve the problem, for example, Japanese utility model application laid open No. 1990-127769 discloses a technique to eliminate a vapor lock by operating only the fuel pump (feed pump) without operating the starter motor for a specified time when an ignition key switch is turned on and after the specified time elapses, namely, the vapor lock is eliminated from the fuel system, the starter motor is permitted to be operated to start the engine. However, when this technique is applied to the high pressure type direct fuel injection engine, since in this type of engine the fuel is supplied from the fuel tank to the high pressure fuel system by the feed pump in the low pressure fuel system and then the the fuel is pressurized up to a specified pressure by the high pressure fuel pump in the high pressure fuel system, there is a high possibility that the fuel is not supplied enough throughout the high pressure fuel system because of the residual vapor therein in operating only the feed pump for a specified time. Especially, at a hot restarting of engine, some portion of the fuel itself supplied to the high pressure fuel system is vaporized therein by the heated distribution pipes or the high pressure fuel pump in a high temperature, and as a result of this there occurs not only a hard starting due to the vapor lock but also a scuffing or a sticking in the sliding part of the high pressure fuel pump.

SUMMARY OF THE INVENTION

The present invention has been made taking the above situation into the consideration. It is a primary object of the present invention to provide a method for preventing a poor lubrication in the high pressure fuel pump which is caused by the vapor in the fuel system.

Additionally, it is a further object of the present invention to provide a method for improving an engine startability, especially at a restarting under the hot condition of engine.

To achieve the abovementioned objects, the fuel pressure control method for the high pressure type direct fuel injection engine according to the present invention comprises the steps of: prohibiting energization of a starter motor for rendering a high pressure fuel pump in the high pressure fuel system inoperative until a predetermined time elapses and at the same time operating a feed pump in the low pressure fuel system; and then permitting energization of the starter motor for rendering the high pressure fuel pump operative after the predetermined time elapses.

Next, a brief explanation about the method according to the present invention will be made.

First, when an engine is started, the starter motor is prohibited from being energized so as to prevent an engine cranking, namely, to prevent an operation of the high pressure fuel pump and at the same time the feed pump in the low pressure fuel system is operated to feed the fuel to the high pressure fuel system. On the other hand, it is checked whether the fuel in the high pressure fuel system is a liquid fuel or a fuel vapor (including a mixture of liquid fuel and bubbled fuel). When it is judged from detection of the liquid fuel for a predetermined time that the vapor is eliminated from the fuel in the high pressure fuel system, the starter motor is permitted to be operated for cranking so that the high pressure fuel pump operates to supply fuel to the fuel injector.

BRIEF DESCRIPTION OF DRAWINGS

FIG. 10 is a diagrammatic view of an electronic control system according to the second embodiment.

DETAILED DESCRIPTION OF PREFERRED EMBODIMENTS

Figure 6:
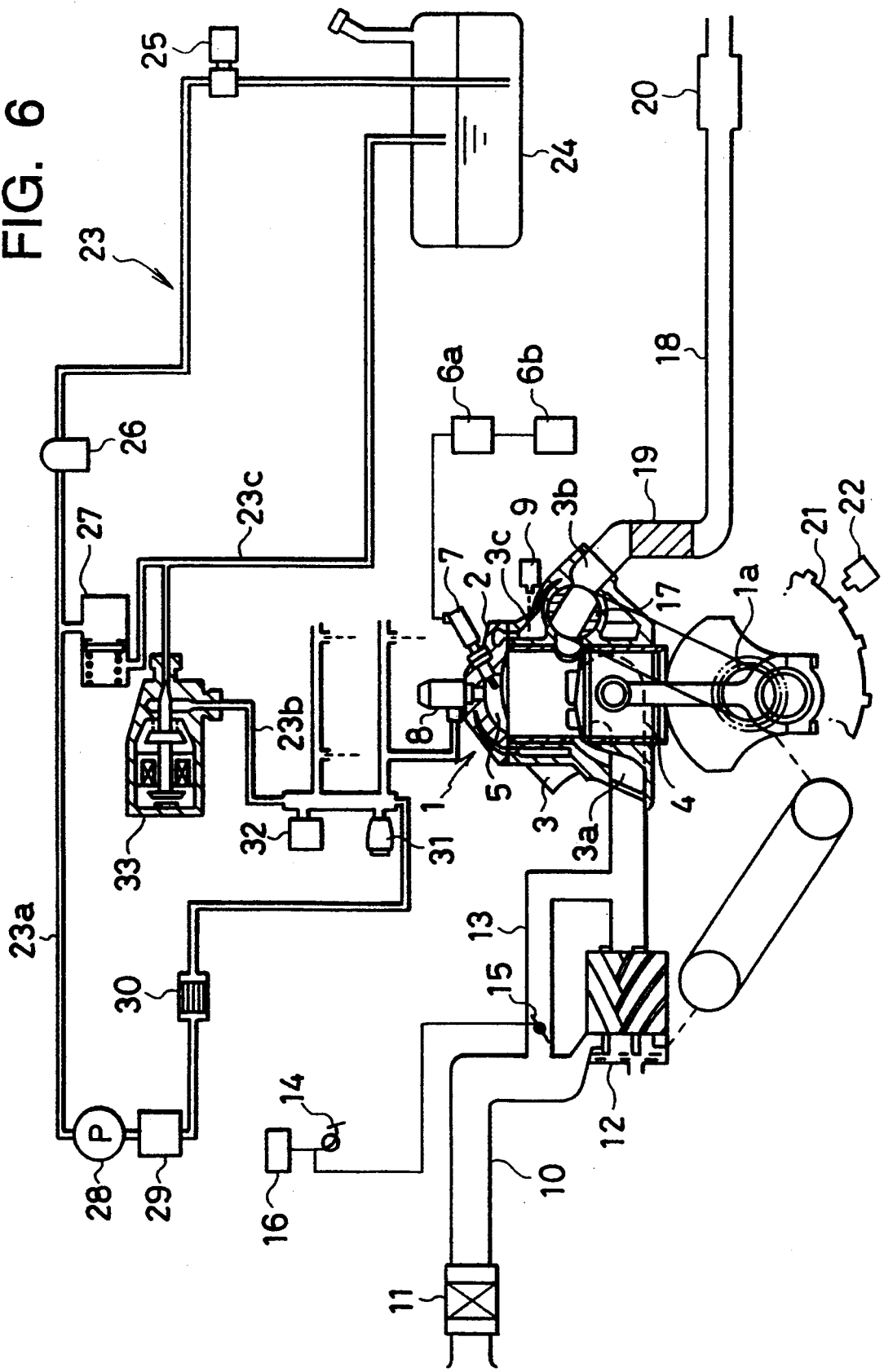
FIG. 6 is a schematic view of a fuel pressure control system according to the first embodiment.

Referring to FIG. 6, a reference numeral 1 denotes a direct fuel injection engine (in this first embodiment, a direct fuel injection two stroke engine). A cylinder head 2, a cylinder block 3 and a piston 4 form a combustion chamber 5 wherein a spark plug 7 and a fuel injector 8 are disposed. The spark plug 7 is connected to the secondary side of an ignition coil 6a. The primary side of the ignition coil 6a is connected with an igniter 6b. Further, a scavenging port 3a and an exhaust port 3b are provided in the cylinder block 3 and in a coolant passage 3c of the cylinder block 3 a coolant temperature sensor 9 is disposed.

Further, an air delivery pipe 10 is connected to the above scavenging port 3a. Upstream of the air delivery pipe 10 there is provided an air cleaner 11 and downstream thereof there is provided a scavenging pump 12 which is driven by a crank shaft 1a. The scavenging pump 12 supplies the fresh air to the engine and at the same time scavenges the combustion chamber 5 forcibly. In a by-pass passage 13 by-passing the above scavenging pump 12 a by-pass control valve 15 operatively linked with an accelerator pedal 14 is provided. Also an accelerator pedal opening sensor 16 is coupled with the accelerator pedal 14. In the abovementioned exhaust port 3b, an exhaust rotary valve 17 mechanically interlocked with the crankshaft 1a is disposed. An exhaust pipe 18 is coupled with the exhaust port 3b through the rotary valve 17. In the exhaust pipe 18, a catalytic converter 19 and a muffler 20 are mounted in this order from upstream to downstream.

Further, a crank rotor 21 is coaxially coupled with the crank shaft 1a mounted on the cylinder block 3 and on the outer periphery of the crank rotor 21 a crank sensor 22 comprising an electromagnetic pick up and the like is provided.

Further, a reference numeral 23 indicates a fuel system comprises a low pressure fuel system 23a which sends the fuel from a fuel tank 24, a high pressure fuel system 23b which feeds the fuel to the fuel injector 8 by applying a pressure and a fuel return system 23c which returns the fuel to the fuel tank 24 as a result of the pressure regulation.

The low pressure fuel system 23a is a system for sending the fuel in the fuel tank 24 to a diaphragm type low pressure fuel regulator 27 via a fuel filter 26 by the pressure of a feed pump 25 and for feeding the fuel to a high pressure fuel pump 28 after the fuel pressure is regulated by the above low pressure fuel regulator 27.

Further, the high pressure fuel system 23b is a system for sending the fuel fed from the low pressure fuel system 23a to an fuel injector 8 of each cylinder by means of the pressure applied by the above high pressure fuel pump 28 through a fuel feed passage along which a fuel sensor 29 for detecting the fuel (liquid fuel) therein, a high pressure fuel filter 30, an accumulator 31 for absorbing a pressure pulsation, and a fuel pressure sensor 32 for detecting the fuel pressure in the high pressure fuel system are disposed, after the fuel pressure is regulated by an electromagnetic (solenoid) type high pressure fuel regulator 33.

The high pressure fuel pump 28 is composed of, for example, a plunger pump directly driven by an engine. In the high pressure fuel pump 28 there is provided a check valve at the suction port and at the discharge port respectively, so the fuel can pass through inside the fuel pump 28 freely even when an engine is stationary.

Further, the above fuel sensor 29 is, for example, a capacitance type of sensor which detects whether the fuel feed passage is full of a liquid fuel (hereinafter referred to as just "fuel", unless defined otherwise) or not by the difference of a dielectric constant between liquid and gas. In this embodiment the fuel sensor 29 is disposed immediately downstream of the discharge port of the high pressure fuel pump 28 but may be disposed at any portion of the high pressure fuel system 23b (generally speaking, preferably downstream of the high pressure fuel system 23b) provided that the fuel filled up in the high pressure fuel pump 28 can be detected.

Further, the low pressure fuel system 23c acts to send back the returning fuel from the diaphragm type low pressure fuel pump 27 and from the electromagnetic type high pressure fuel regulator 33 to the fuel tank 24. Since the high pressure fuel regulator 33 in this embodiment is a full time open type (open unless energized), the valve opening degree becomes small to raise the fuel pressure in the high pressure fuel system 23b as an ON duty DUTY becomes large. The valve is closed at the ON duty DUTY=100%.

Figure 7:
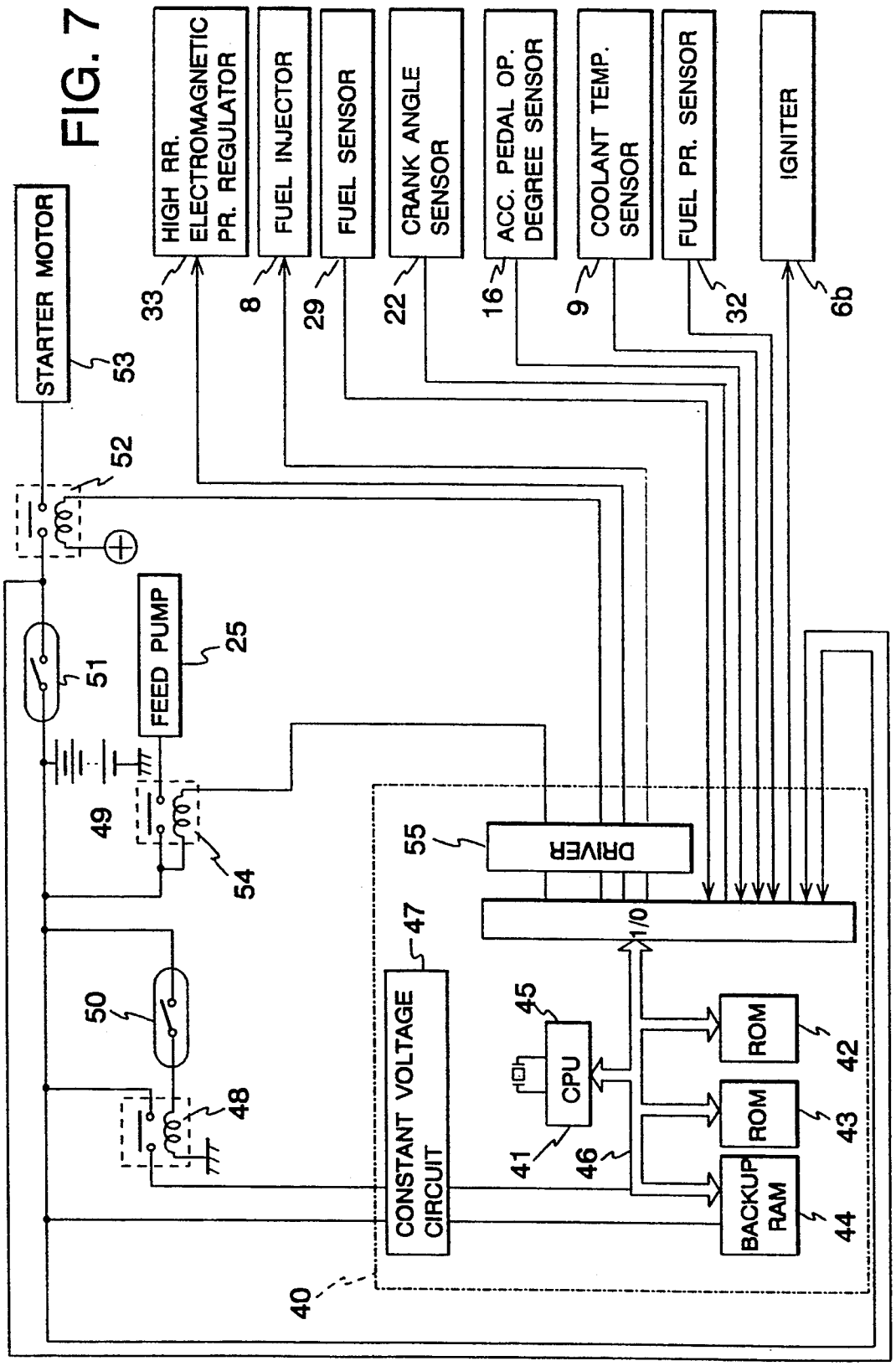
FIG. 7 is a diagrammatic view of an electronic control system according to the first embodiment.

On the other hand, a numeral 40 of FIG. 7 is an electronic control unit (ECU) which comprises a CPU 41, a ROM 42, RAM 43, a backup RAM 44, an I/O interface 45 connecting these altogether through a bus line 46. Further, the ECU 40 incorporates therein a constant voltage circuit 47 which is connected to a battery 49 via a relay contact of an ECU relay 48 and at the same time connected to the battery 49 directly. Also a relay coil of the ECU relay 48 is connected to the battery 49 via an ignition key switch 50. That is to say, the constant voltage circuit 47 stabilizes the voltage of the battery 49 and supplies the stabilized voltage to miscellaneous components in the ECU 40 when the ignition key switch 50 is turned on and a contact of the ECU relay 48 is made. When the ignition key switch 50 is turned off to break a contact of the ECU relay 48, the constant voltage circuit 47 supplies a backup voltage to the backup RAM 44.

Further, the battery 49 is connected with a starter switch 51 and the starter switch 51 is connected to a starter motor 53 via a relay contact of a starter motor relay 52. Furthermore, the battery 49 is connected to the feed pump 25 via a relay contact of a feed pump relay 54. Also the battery 49 is connected to an input port of the I/O interface 45 and the battery voltage is monitored therein. The I/O interface 45 is connected to the starter switch 51, the fuel sensor 29, the crank angle sensor 22, the accelerator pedal opening angle sensor 16, the coolant temperature sensor 9 and the fuel pressure sensor 32.

On the other hand, an output port of the I/O interface 45 is connected to the igniter 6b for driving the ignition coil 6a, further to the relay coil of the starter motor relay 52 for delivering the power supply to the starter motor 53, the relay coil of the feed pump relay 54 for delivering the power supply to the feed pump 25, the fuel injector 8 and the electromagnetic type high pressure fuel regulator 33.

Next, an operation of the ECU 40 will be explained according to flowcharts shown in FIGS. 1 to 5.

First, when the ignition key switch 50 is turned on and the ECU 40 is energized, miscellaneous flags, a count value and an I/O port value are initiated. The flowcharts in FIGS. 1 and 2 indicate a fuel pressure control routine where it is judged whether a normal control transition flag $F_3$, a fuel detection flag $F_2$ and an initiation completion flag $F_1$ are set or not at S101, S102 and S103 respectively. When the routine is the first execution, since these flags $F_3$, $F_2$ and $F_1$ have been already cleared ($F_3=0$, $F_2=0$ and $F_1=0$), the process goes to S104 where a starter motor prohibition flag $F_{ST}$ is set ($F_{ST}=1$). In case of $F_{ST}=1$, the starter motor 53 is prohibited to be energized even when the starter switch 51 is turned on.

Next, the process goes to S105 where an ON duty DUTY for the high pressure fuel regulator 33 is set to be 0 (%) (DUTY=0) and at the next step S106 this value (0%) is set as an I/O port output value for the high pressure fuel regulator 33 for rendering the high pressure fuel regulator 33 fully open. Further, the process goes to S107 where an I/O port output value $G_1$ for the relay coil of the feed pump relay 54 is set to 1 ($G_1=1$) to energize the feed pump relay 54 for operating the feed pump 25. As a result of this, the feed pump starts to operate and the fuel starts to flow throughout the fuel system. At the next step S108 the initiation completion flag $F_1$ is set ($F_1=1$) and then the process is returned to the main routine.

In summary, the first execution of the fuel pressure control routine abovementioned comprises the steps of: prohibiting to energize the starter motor 53 for making the engine inoperative; rendering the high pressure fuel regulator 33 fully open for making the free flow of fuel in the fuel system; and starting to operate the feed pump 25 for circulating the fuel in the fuel system in order to purge the residual fuel vapor in the high pressure fuel system 23b.

At the second execution of the fuel pressure control routine, since the initiation completion flag $F_1$ has been set, the process is diverted from S103 to S109 where it is checked whether the fuel (liquid fuel) is detected or not in the high pressure fuel system 23b based on the output signal from the fuel sensor 29. In case where no fuel is detected, the process passes to S116 where a fuel detecting time count value C for counting the continuation time of the fuel detecting state is cleared (C=0) and then the routine returns to the main routine. In case where the fuel is detected at the second execution or at a specified time execution of the routine, the process goes from S109 to S110 at which the fuel detecting count value C is compared with a predetermined value $C_S$ to judge whether the fuel detecting state has continued for a predetermined time. The predetermined value $C_S$ corresponds to a predetermined time during which the fuel vapor is deemed to have been purged out almost completely, the high pressure fuel system 23b being filled up with fuel. This value $C_S$ is obtained beforehand from experiments or other means and is stored in the ROM 42. Even if the fuel is detected, C is less than $C_S$ ($C<C_S$) at the beginning and therefore the process goes from S110 to S111 where the count value C is counted up (C=C+1) and the routine returns to the main routine. After a while, when C becomes equal to or larger than $C_S$ ($C \geq C_S$), the process goes from S110 to S112. At S112 the ON duty DUTY for the high pressure fuel regulator 33 is set to be FFH (100%) and at the next step S113 the I/O port output value for the high pressure regulator 33 is set. As a result of this, the high pressure fuel regulator 33 is closed to raise the fuel pressure both in the low pressure fuel system 23a and the high pressure fuel system 23b. Further, the process goes to S114 where the fuel detecting flag $F_2$ is set ($F_2=1$) and at the next step S115 the starter motor prohibition flag $F_{ST}$ is cleared ($F_{ST}=0$) to permit energization of the starter motor 53. At S116 the count value C is cleared (C=0) and the routine returns to the main routine.

When the engine is started by clearing the starter motor prohibition flag $F_{ST}$, the high pressure fuel pump 28 driven by the engine operates to raise the fuel pressure $P_F$ in the high pressure fuel system 23b. In this case, since the fuel detecting flag $F_2$ has been set, at the next execution of the routine the process passes from S102 to S117 where the fuel pressure $P_F$ in the high pressure fuel system 23b is compared with a predetermined normal pressure $P_H$ (for example, 1×Pa) to judge whether or not the fuel pressure $P_F$ in the high pressure fuel system 23b reaches the normal pressure $P_F$.

If $P_F \geq P_H$ at S117, the process goes out of the routine. If the fuel pressure $P_F$ reaches the normal pressure $P_H$ ($P_F > P_H$), the process goes from S117 to S118 where the normal control transition flag $F_3$ is set ($F_3=1$) and the routine returns to the main routine. Since the normal control transition routine $F_3$ is set, at the next execution of the routine the process is diverted from S101 to S119. At the steps after S119 the process transfers to a fuel pressure normal control to feedbackcontrol the fuel pressure.

In this fuel pressure normal control, at S119 a target fuel pressure $P_{FS}$ is determined from a target fuel pressure look-up table parameterizing the engine speed N. The target fuel pressure look-up table is obtained from experimental data and the like in consideration of the performance required of the engine, the characteristics of the fuel pump and so on. As shown in a diagram of S119, the look-up table stored in predetermined addresses of the ROM 42 is so determined as the target fuel pressure $P_{FS}$ becomes high with the increase of the engine speed and becomes low with the decrease of the engine speed.

Next, the process goes from S119 to S120 where a basic control amount, i.e., a basic duty $D_B$ for the high pressure fuel regulator 33 is determined from a predetermined basic control table or a formula parameterizing the target fuel pressure $P_{FS}$. Further, at the next step S121, a deviation $\Delta P$ between the target fuel pressure $P_{FS}$ and the fuel pressure $P_F$ is calculated ($\Delta P = P_{FS} - P_F$) and the process goes to S122. At S122, a proportional part feedback value P is obtained by multiplying a proportional constant $K_P$ in a proportional-plus-integral control by the above deviation $\Delta P$ ($P = K_P \times \Delta P$). Further, at S123, an integral constant $K_I$ in the proprtional-plus-integral control multiplied by the above deviation $\Delta P$ is added to the last time integral feedback value $I_{OLD}$ read from the RAM 43, whereby a new integral feedback value I is obtained ($I = I_{OLD} + K_I \times \Delta P$).

Next, the process goes to S124 where the last time feedback value $I_{OLD}$ stored in the RAM 43 is updated by the above integral feedback value I. At the next S125, an ON duty DUTY which is a feedback control amount for the high pressure fuel regulator 33, is determined by adding the above proportional feedback value P and the above integral feedback value I to the above basic duty $D_B$ (DUTY=$D_B$+P+I) and the process goes out of the routine after the ON duty DUTY is set at S126. As a result of this, the feedback control is performed such that the target fuel pressure $P_{FS}$ is followed up by the fuel pressure $P_F$.

When the fuel vapor remains on in the high pressure fuel system 23b the liquid fuel is not detected continuously, and therefore start is prohibited by rendering the starter motor 53 inoperative. When the fuel vapor is purged out of the high pressure fuel system 23b and only the liquid fuel is detected therein, the engine is started by releasing the restriction to the starter motor 53. There is prevented not only a sticking or a scuffing in the high pressure fuel pump 28 due to a poor lubrication, but also an overshoot of the fuel pressure due to gas (vapor) compression or a void injection at the injector 8, whereby a good engine startability is obtained.

Figure 1:
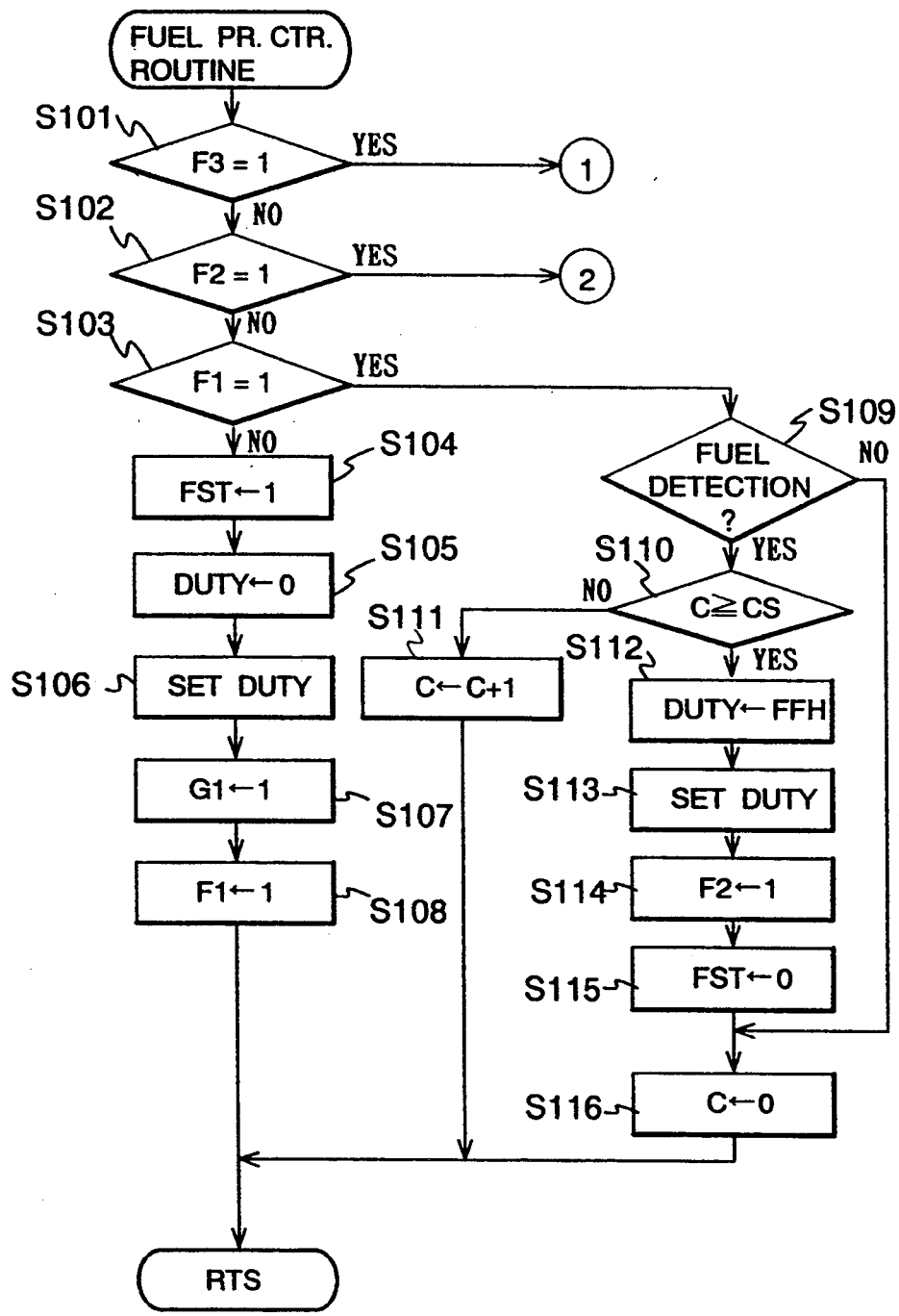
FIGS. 1 and 2 are flowcharts indicating a fuel pressure control routine according to the first embodiment.
Figure 2:
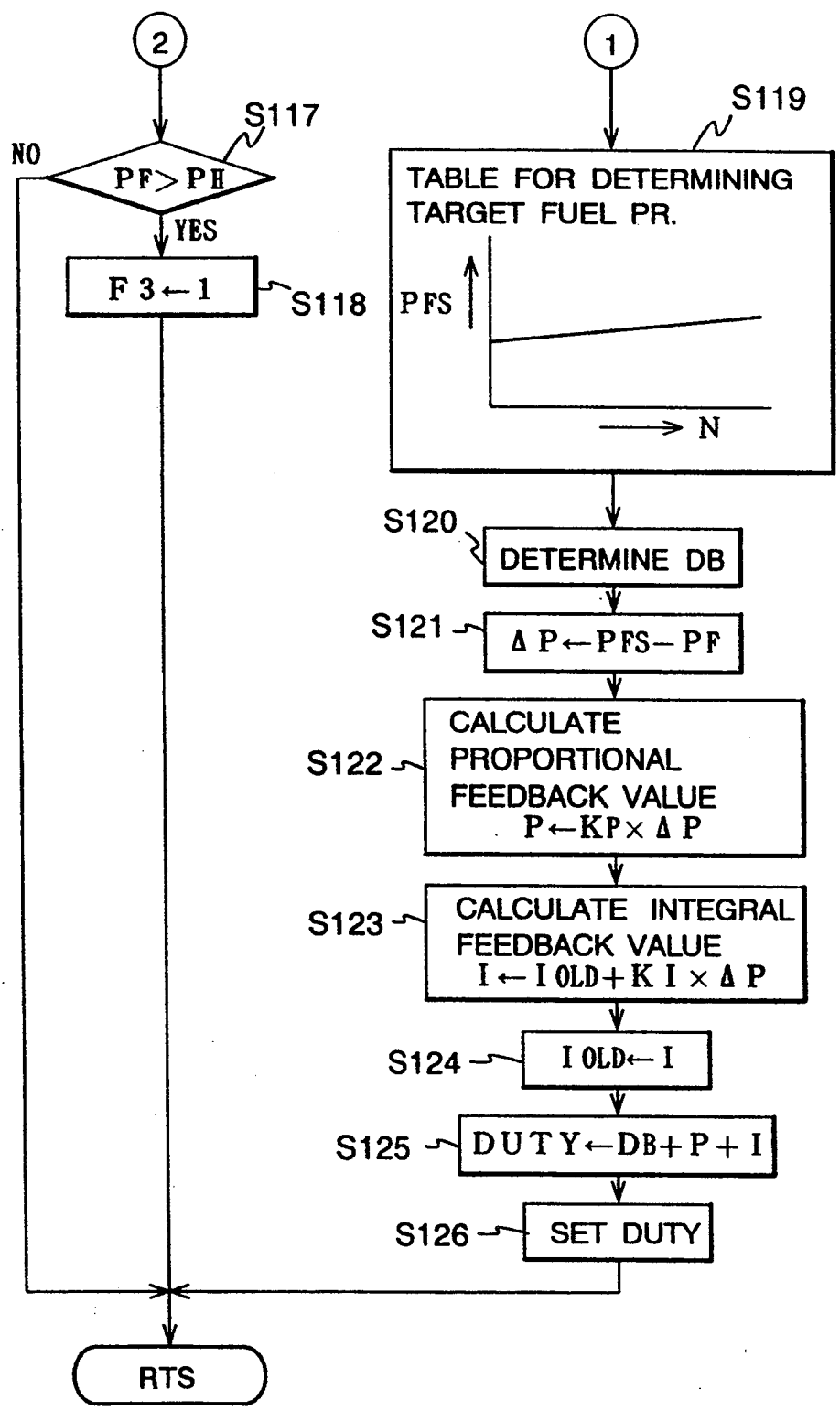
Figure 3:
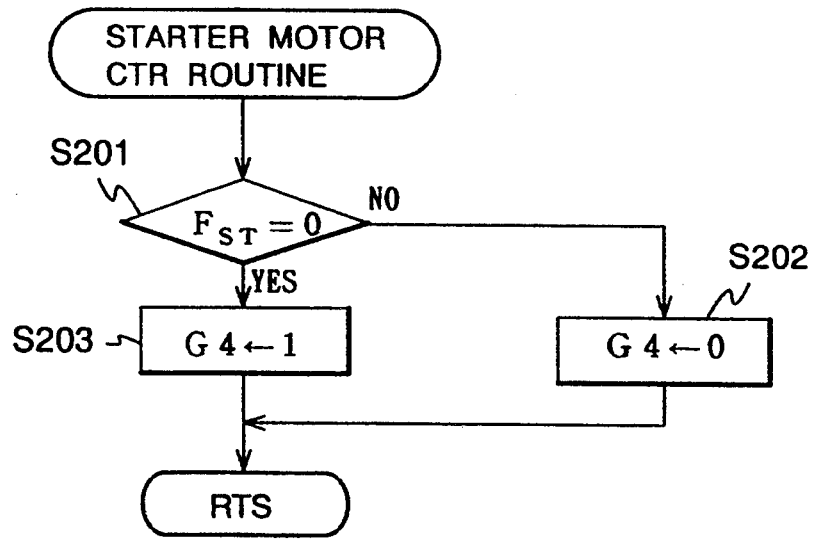
FIG. 3 is a flowchart indicating a starter motor control routine.

A flowchart indicated in FIG. 3 is a starter motor control routine which is carried out at a specified interval only when the starter motor switch 51 is in an "ON" position. First, at S201 the starter motor prohibition flag $F_{ST}$ is looked up to judge whether the starter motor 53 is permitted to be energized or not. In case of $F_{ST}=1$, i.e., where the starter motor 53 is prohibited to be energized, the process is diverted to S202 at which an I/O port output value $G_4$ for the starter motor relay 52 is set to be 0 ($G_4=0$) to switch the starter motor relay 52 off and then the routine is returned to the main routine. On the other hand, in case of $F_{ST}=0$, i.e., where the starter motor 53 is permitted to be energized, the process is advanced to S203 at which the I/O port output value $G_4$ is set to be 1 ($G_4=1$) to switch the starter motor relay 52 on and then the routine is returned to the main routine. As a result of this routine, the starter motor 53 is energized and an engine cranking is started.

Figure 4:
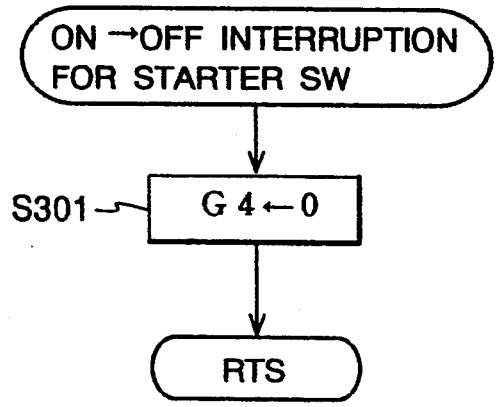
FIG. 4 is a flowchart showing a starter switch ON-OFF interruption routine.

On the other hand, a flowchart indicated in FIG. 4 is a starter switch ON to OFF interruption routine. The routine is started to be carried out when the starter switch 51 is turned off. At S301, an I/O port output value $G_4$ to the starter motor relay 52 is set to be 0 ($G_4=0$), so that the starter motor relay 52 is turned off and the routine is returned to the main routine.

Figure 5:
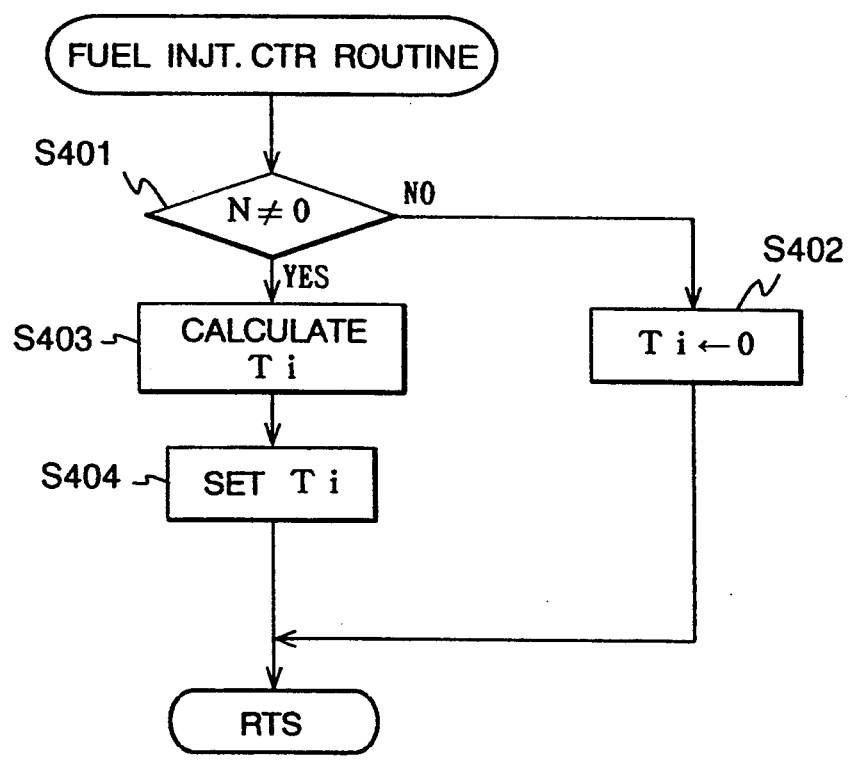
FIG. 5 is a flowchart showing a fuel injection control routine.

Further, a flowchart indicated in FIG. 5 is a fuel injection control routine which is carried out at a specified interval after the system is initiated. First, at S401 it is judged whether or not an engine speed N is "0", that is to say, an engine is rotated. If N=0, namely, the engine is stationary, the process goes to S402 where a fuel injection pulse width Ti is set to be 0 to stop the fuel injection and the routine is returned to the main routine. On the other hand, if N≠0, the process is advanced from S401 to S403 where an optimum fuel injection pulse width $T_i$ is calculated based on an induction air amount Q, a target air-fuel ratio determined according to the engine speed N and others, an air-fuel ratio feedback correction coefficient and so on. At the next step S404 the above calculated fuel injection pulse width $T_i$ is set and therefrom the step goes out of the routine. As a result of this, a drive signal corresponding to the fuel injection pulse width $T_i$ is outputted with a specified timing to the fuel injector 8 of the corresponding cylinder and the fuel is injected therein accordingly.

It will be understood that the preferred embodiment according to the present invention is not intended to be limited to just the preferred embodiment described thereabove. In an example, the high pressure fuel pump 28 may be an electrically driven fuel pump, instead of an engine direct drive type, and further the fuel sensor 29 may be a sensor for detecting a change of conductance by an existence or a nonexistence of the fuel, instead of a capacitance type. Furthermore, the electromagnetic type high pressure fuel regulator 33 may be a fuel regulator which regulates the fuel pressure by opening or closing a valve thereof with a certain level of electrical current (direct current), instead of a duty signal.

The first embodiment aforementioned is an example applied to the two stroke engine, however this embodiment can be applied also to the four stroke engine without modifying the components of the fuel system.

Next, the second embodiment according to the present invention will be explained. The second embodiment is applied mainly to a direct fuel injection four stroke engine capable of choosing a wide pulse width for fuel injection, compared to a direct fuel injection two stroke engine. The fuel pressure control system according to this second embodiment is characterized in that the components of the system are more simplified and therefore it is less costly than the system according to the first embodiment.

Further, a brief explanation about the second embodiment will be made.

Figure 9:
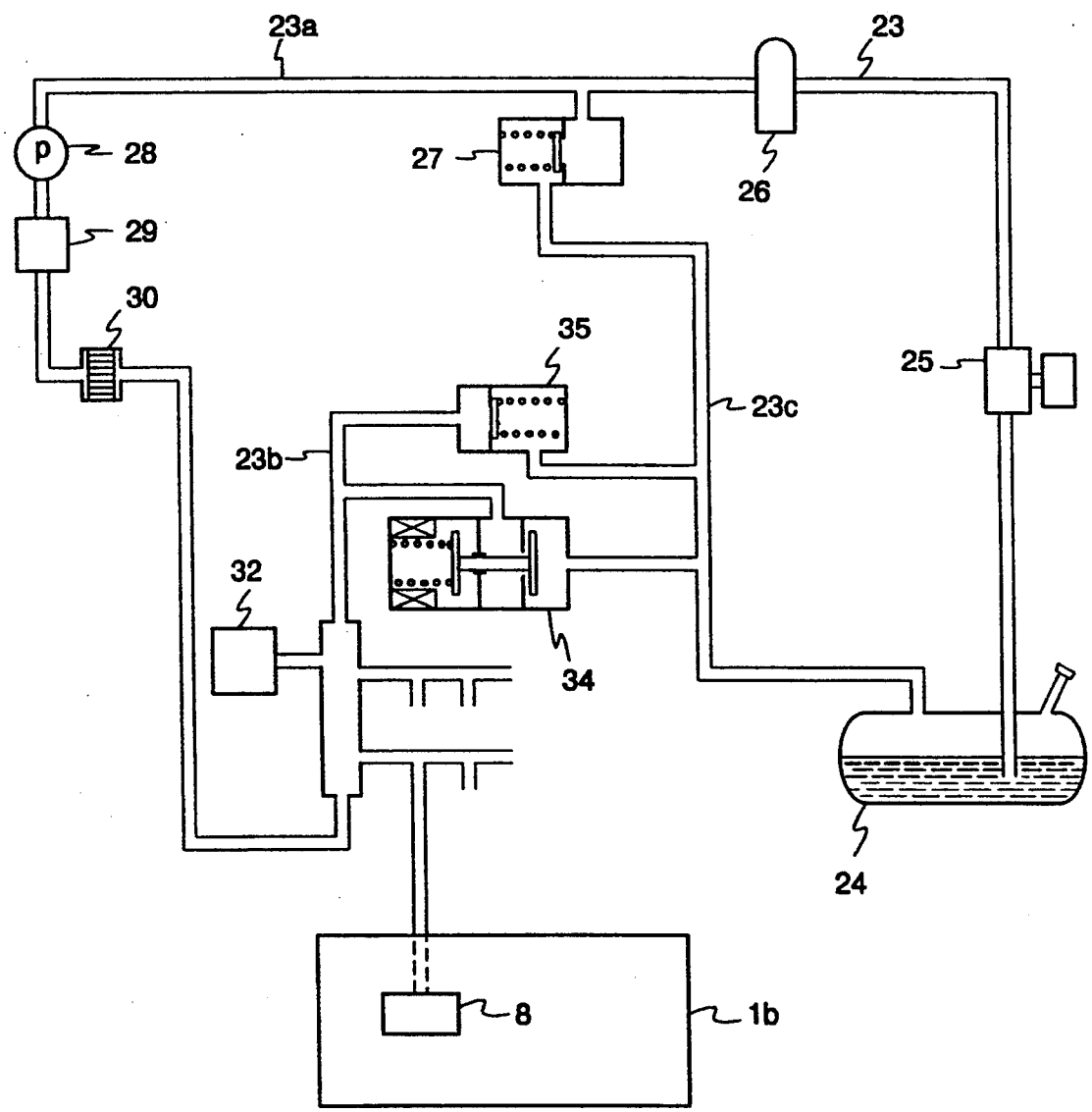
FIG. 9 is a schematic drawing of a fuel pressure control system according to the second embodiment.

Referring now to FIG. 9, the difference in components according to the second embodiment from the first embodiment in FIG. 6 is that:

the electromagnetic type high pressure fuel regulator 33 is replaced with a mechanical type high pressure fuel regulator 35; a solenoid-operated stop valve 34 is equipped in a by-pass passage by-passing between the high pressure fuel system 23b and the fuel return system 23c; the fuel pressure sensor 31 is deleted; and the engine 1 is replaced with a direct fuel injection four stroke engine 1b that is commonly known.

The mechanical type high pressure fuel regulator 35 is an ever-closed type of valve in which a spring biases a valve body to a valve seat to close it. The valve is opened by the pressure applied on the valve body against the spring force only when the fuel pressure exceeds a predetermined value, whereby it acts as regulating the fuel pressure of the fuel in the high pressure fuel system 23b to the predetermined value. The solenoid-operated stop valve 34 is a shut-off valve which opens when its solenoid is not energized and closes when energized and plays a role of permitting escape of a fuel vapor therethrough to the fuel tank 24 at an engine start.

Figure 8:
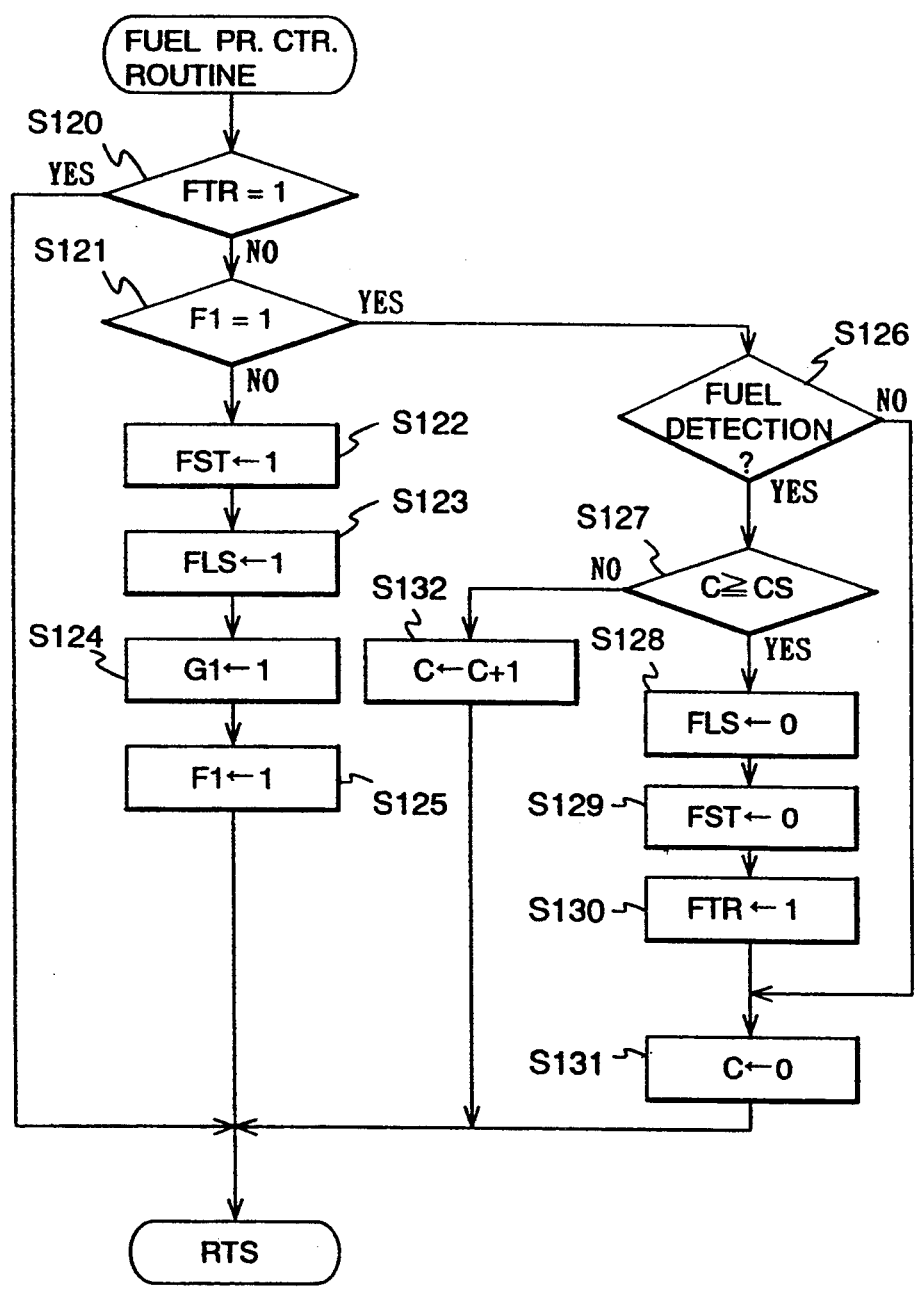
FIG. 8 is a flowchart indicating a fuel pressure control routine according to the second embodiment.

Next, an operation of the fuel pressure control system according to the second embodiment will be explained briefly by referring to FIGS. 7 and 8.

When the power source is applied to the ECU 40, when the system is initiated, namely the initiation completion flag $F_1=0$, at the first execution of the routine the process goes to S122 where the starter motor prohibition flag $F_{ST}$ is set to be 1 so as to render the starter motor 53 inoperative. At the next step S123 a stop valve opening flag $F_{LS}$ is set to be 1 so as to open the electromagnetic stop valve 34. At S124 the I/O port output value $G_1$ is set to be 1 to operate the feed pump 25. Further, at S125 the initiation completion flag $F_1$ is set to be 1 and then the routine is returned to the main routine.

At executions of the routine after the first execution, the process is diverted to S126 where it is judged whether or not the fuel is detected. If the fuel is detected, the process goes to S127 where it is judged whether or not the count value C exceeds the predetermined count value $C_S$. If $C \geq C_S$, at S128 the stop valve opening flag $F_{LS}$ is set to be 0 so as to shut-off the electromagnetic stop valve 34. Further at S129 the starter motor prohibition flag $F_{ST}$ is set to be 0 so as to render the starter motor 53 operative. Further at S130 a pass-over flag $F_{TR}$ is set to be 1 and the routine is returned to the main routine after the count value C is cleared at S131. Once the pass-over flag $F_{TR}$ is set, the process is returned directly to the main routine through the first step S120 of this routine.

Other routines described in the first embodiment, the starter motor control routine as shown in FIG. 3, the starter switch ON/FF interruption routine as shown in FIG. 4 and the fuel injection control routine as shown in FIG. 5, these are carried out in the same manner as in the first embodiment.

As a result of executing this fuel pressure control routine according to the second embodiment, at an engine start the fuel vapor in the fuel system is purged out through the stop valve 34 and when the fuel vapor is finished purging the stop valve 34 is closed to allow the pressure rise in the high pressure fuel system. Further at the same time the starter motor 53 is energized to start of the engine.

In summary, the present invention provides a fuel system characterized in that:

when an engine is started, only a feed pump is operated to feed the fuel to the high pressure fuel system with a starter motor inoperative and after the high pressure fuel system is filled up with the fuel the starter motor is rendered operative, so that a sticking and a scuffing due to the residual fuel vapor in the high pressure fuel pump can be prevented and further an overshoot of the fuel pressure and a void fuel injection can also be avoided, whereby an excellent effect on the starting performance of engine is attained.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A fuel pressure control method for a direct fuel injection engine having, a starter motor for cranking said engine, an ignition key switch for operating said starter motor, a fuel injector connected to a high pressure fuel system for injecting a high pressure fuel into a cylinder of said engine, a fuel tank for storing a fuel, a feed pump for pumping up said fuel from said fuel tank to a low pressure fuel system and for feeding said fuel from said low pressure fuel system to said high pressure fuel system, a high pressure fuel pump for producing a high pressure fuel in said high pressure fuel system and for supplying said high pressure fuel to said fuel injector, a high pressure fuel regulator for regulating the fuel pressure in said high pressure fuel system and for returning said fuel in said high pressure fuel system to said fuel tank, a fuel sensor for detecting the presence of liquid fuel in said high pressure fuel system, and an electronic control unit for controlling said engine, the method comprising:

detecting said fuel in said high pressure fuel system by said fuel sensor when said ignition key switch is turned on;
 counting an elapsed time during which said fuel is detected by said fuel sensor when said fuel is detected;
 judging whether or not said elapsed time reaches a predetermined time;
 prohibiting energizing said starter motor so as to render said high pressure fuel pump inoperative until said elapsed time reaches said predetermined time when said ignition key switch is turned on;
 returning said fuel in said high pressure fuel system to said fuel tank until said elapsed time reaches said predetermined time when said ignition key switch is turned on;
 operating said feed pump so as to return said fuel in said high pressure fuel system to said fuel tank until said elapsed time reaches said predetermined time when said ignition key switch is turned on; and
 permitting energization of said starter motor so as to render said high pressure fuel pump operative when said elapsed time reaches said predetermined time.

2. A fuel pressure control system for a direct fuel injection engine having, a starter motor for cranking said engine, an ignition key switch for operating said starter motor, a fuel injector connected to a high pressure fuel system for injecting a high pressure fuel into a cylinder of said engine, a fuel tank for storing a fuel, a feed pump for pumping up said fuel from said fuel tank to a low pressure fuel system and for feeding said fuel from said low pressure fuel system to said high pressure fuel system, a high pressure fuel pump for producing a high pressure fuel in said high pressure fuel system and for supplying said high pressure fuel to said fuel injector, a high pressure fuel regulator for regulating the fuel pressure in said high pressure fuel system and for returning said fuel in said high pressure fuel system to said fuel tank, a fuel sensor for detecting the presence of liquid fuel in said high pressure fuel system, and an electronic control unit for controlling said engine, the system which comprises:

detecting means for detecting said fuel in said high pressure fuel system by said fuel sensor when said ignition key switch is turned on;
 counting means for counting an elapsed time during which said fuel is detected by said fuel sensor when said fuel is detected;
 judging means for judging whether or not said elapsed time reaches a predetermined time;
 prohibiting means for prohibiting energization of said starter motor so as to render said high pressure fuel pump inoperative until said elapsed time reaches said predetermined time when said ignition key switch is turned on;
 opening means for opening said high pressure fuel regulator so as to return said fuel in said high pressure fuel system to said fuel tank until said elapsed time reaches said predetermined time when said ignition key switch is turned on;
 operating means for operating said feed pump so as to return said fuel in said high pressure fuel system to said fuel tank until said elapsed time reaches said predetermined time when said ignition key switch is turned on; and
 energizing means for admitting to energize said starter motor so as to render said high pressure fuel pump operative when said elapsed time reaches said predetermined time.

3. The system according to claim 2, wherein said high pressure fuel pump is a mechanical pump including a plunger pump driven directly by said engine.

4. The system according to claim 2, wherein said high pressure fuel pump is a mechanical pump including a plunger pump driven by an electric power.

5. The system according to claim 2, wherein said fuel sensor is a sensor for detecting a change of dielectric constant.

6. The system according to claim 2, wherein said fuel sensor is a sensor for detecting a change of conductance.

7. The system according to claim 2, wherein said first high pressure fuel regulator is a solenoid-operated type.

8. The system according to claim 2, wherein a valve opening degree of said high pressure fuel regulator is controlled by a duty signal generated from said electronic control unit.

9. The system according to claim 2, wherein a valve opening degree of said high pressure fuel regulator is controlled by a direct current.

10. The system according to claim 2, wherein said second high pressure fuel regulator is a mechanical type which regulates fuel pressure by the balance of a spring force and a fuel pressure.

11. The system according to claim 2, wherein said engine is a direct fuel injection two stroke engine.

12. The system according to claim 2, wherein said engine is a direct fuel injection four stroke engine.

13. An automobile having the fuel pressure control system according to claim 2.

14. A fuel pressure control system for a direct fuel injection engine having, starter motor for cranking said engine, an ignition key switch for operating said starter motor, a fuel injector connected to a high pressure fuel system for injecting a high pressure fuel into a cylinder of said engine, a fuel tank for storing a fuel, a feed pump for pumping up said fuel from said fuel tank to a low pressure fuel system and for feeding said fuel from said low pressure fuel system to said high pressure fuel system, a high pressure fuel pump for producing a high pressure fuel in said high pressure fuel system and for supplying said high pressure fuel to said fuel injector, a high pressure fuel regulator for regulating the fuel pressure in said high pressure fuel system, a stop valve for returning said fuel in said high pressure fuel system to said fuel tank, a fuel sensor for detecting a presence of liquid fuel in said high pressure fuel system, and an electronic control unit for controlling said engine, the system which comprises:

- detecting means for detecting said fuel in said high pressure fuel system by said fuel sensor when said ignition key switch is turned on;
- counting means for counting an elapsed time during which said fuel is detected by said fuel sensor when said fuel is detected;
- judging means for judging whether or not said elapsed time reaches a predetermined time;
- prohibiting means for prohibiting energization of said starter motor so as to render said high pressure fuel pump inoperative until said elapsed time reaches said predetermined time when said ignition key switch is turned on;
- opening means for opening said stop valve so as to return said fuel in said high pressure fuel system to said fuel tank until said elapsed time reaches said predetermined time when said ignition key switch is turned on;
- operating means for operating said feed pump so as to return said fuel in said high pressure fuel system to said fuel tank until said elapsed time reaches said predetermined time when said ignition key switch is turned on; and
- energizing means for permit energization of said starter motor so as to render said high pressure fuel pump operative when said elapsed time reaches said predetermined time.

15. The system according to claim 14, wherein said stop valve is a solenoid-operated type.

16. The system according to claim 14, whwerein said stop valve is an electric motor powered type.

17. An automobile having the fuel pressure control system according to claim 14.

* * * * *